Nov. 5, 1968 H. F. HILD ETAL 3,409,758
OVEN CONTROL MEANS AND PARTS THEREFOR OR THE LIKE
Filed March 7, 1966 2 Sheets-Sheet 1
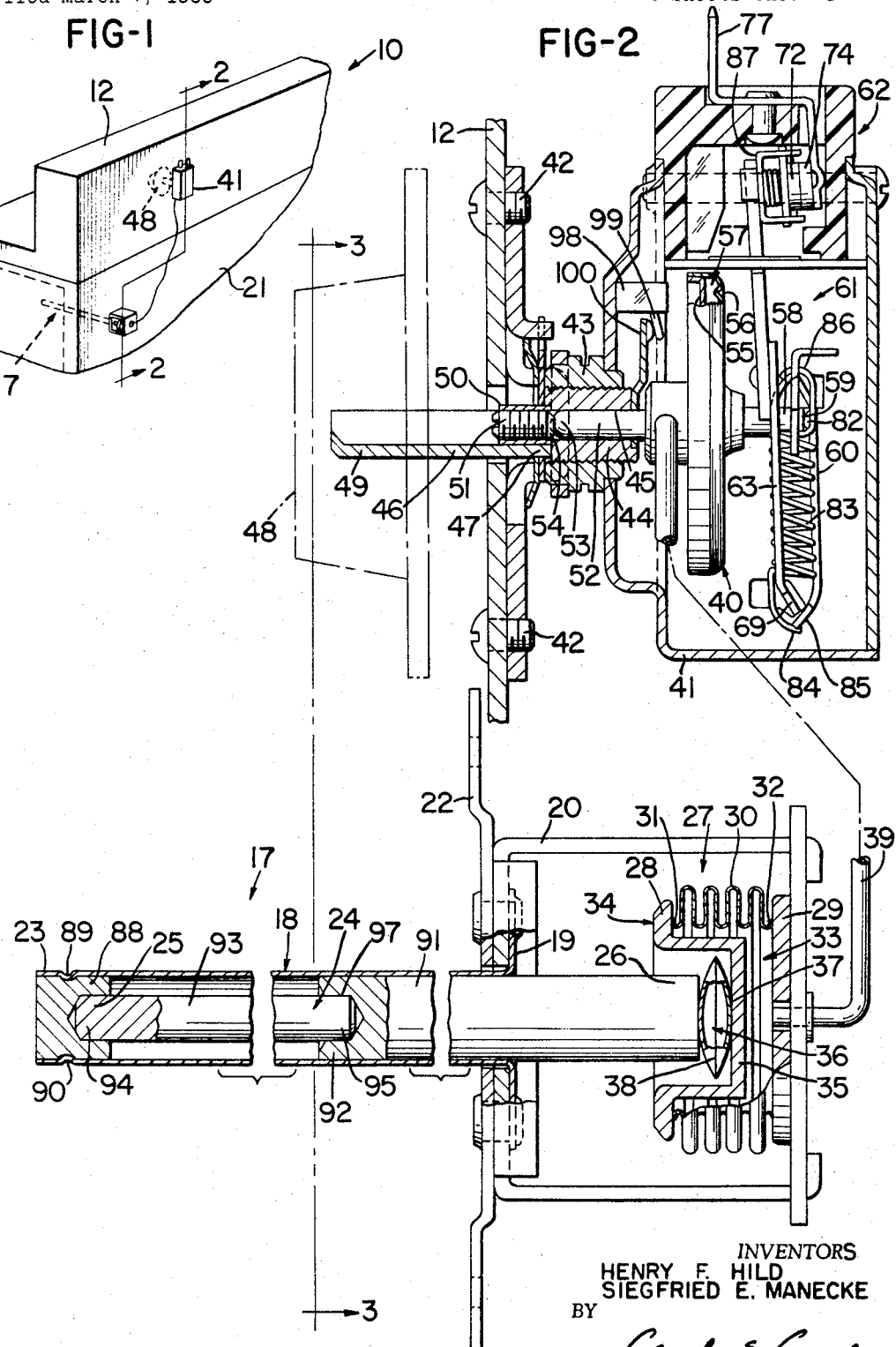
INVENTORS
HENRY F. HILD
SIEGFRIED E. MANECKE
BY
*Cauden & Cauden*
THEIR ATTORNEYS Nov. 5, 1968
H. F. HILD ET AL
3,409,758
OVEN CONTROL MEANS AND PARTS THEREFOR OR THE LIKE
Filed March 7, 1966
2 Sheets-Sheet 2
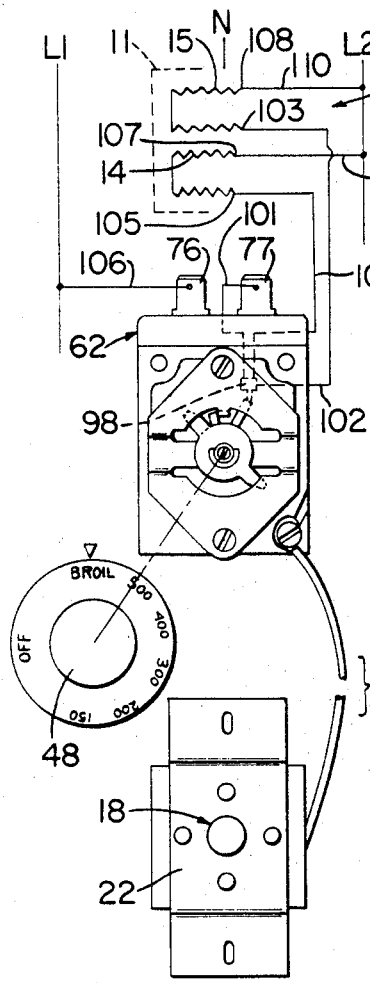
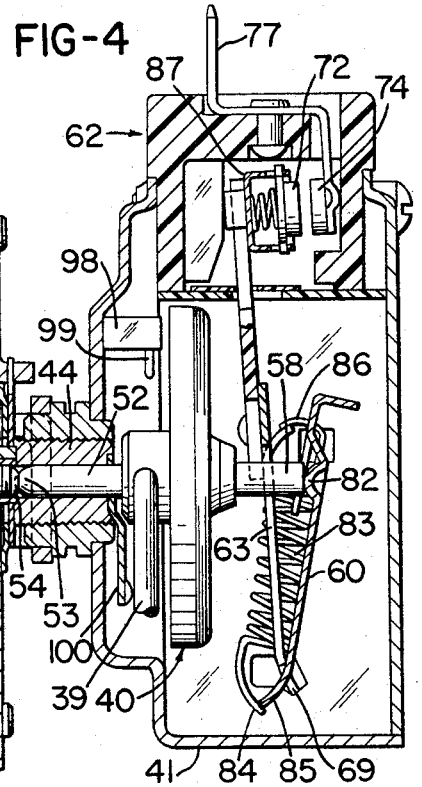
INVENTORS
HENRY F. HILD
SIEGFRIED E. MANECKE
BY *Candor & Candor*
THEIR ATTORNEYS

United States Patent Office 3,409,758
Patented Nov. 5, 1968

3,409,758
OVEN CONTROL MEANS AND PARTS THEREFOR OR THE LIKE
Henry F. Hild and Siegfried E. Manecke, Indiana, Pa., assignors to Robertshaw Controls Company, Richmond, Va., a corporation of Delaware
Filed Mar. 7, 1966, Ser. No. 532,207
21 Claims. (Cl. 219—413)

This invention relates to an improved control means for a cooking apparatus or the like as well as to improved parts for such a cooking apparatus or the like.

It is well known that various appliance manufacturers are producing cooking apparatus for the home or the like wherein the cooking oven is adapted to be selectively controlled for various types of cooking operations thereof.

It has been found, according to the teachings of this invention, that because of the wide range of temperatures being required for such an oven during the different cooking operations thereof, prior known temperature sensing means have prevented accurate control of the same and/or such prior known temperature sensing means are relatively complicated and expensive for controlling such temperature ranges.

However, according to the teachings of this invention, an improved oven control system is provided wherein certain operating conditions of the oven or the like are controlled by the temperature sensed by a novel temperature sensing unit of this invention.

In particular, this invention provides a system wherein a rod and tube temperature sensing unit is utilized for controlling the heating operation of the oven or the like during normal cooking operations thereof, the rod and tube unit being relatively simple to manufacture and being uniquely interconnected to the apparatus to provide the above operations in a manner hereinafter described.

Accordingly, it is an object of this invention to provide an improved control means for a cooking apparatus or the like, the control means of this invention having one or more of the novel features set forth above or hereinafter shown or described.

Another object of this invention is to provide an improved part for controlling the operation of a cooking apparatus or the like, the improved part of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a fragmentary perspective view of the rear portion of a conventional cooking apparatus utilizing the various features of this invention.

FIGURE 2 is an enlarged, cross sectional view taken on line 2—2 of FIGURE 1 and illustrates the rod and tube temperature sensing unit of this invention.

FIGURE 3 is a schematic view illustrating the control system for the apparatus of FIGURE 1 utilizing the sensing unit of FIGURE 2.

FIGURE 4 is a fragmentary cross sectional view similar to FIGURE 2 and illustrates the unit of FIGURE 2 in another operating position thereof.

FIGURE 5 is an exploded perspective view of certain of the parts of the unit of FIGURE 2.

FIGURE 6 is a perspective view of one of the parts of FIGURE 5.

While the various features of this invention are hereinafter described and illustrated as being particularly adaptable for providing the control means for electrical heater means, it is to be understood that the various features of this invention can be utilized singly or in any combination thereof to provide control means for other types of heater means, such as gas burning heating means or the like, as desired.

Therefore, this invention is not to be limited to only the embodiment illustrated in the drawings, because the drawings are merely utilized to illustrate one of the wide variety of uses of this invention.

Referring now to FIGURE 1, the improved control means and parts of this invention are adapted to control various operations of a conventional cooking apparatus, such as the domestic free-standing range 10 illustrated schematically in FIGURE 1 which has an oven 11 therein and a control panel means 12.

As illustrated in FIGURE 3, the oven 11 of the cooking apparatus 10 includes a conventional electrical heating means 13 which in the embodiment illustrated in FIGURE 3 comprises an electrically operated bake heating element 14 and an electrically operated broil heating element 15, the heating means 13 being adapted to be supplied electrical current from a conventional three-wire electrical power source comprising two power lines $L^1$ and $L^2$ and a neutral line N in a manner hereinafter set forth.

The control system of this invention is generally indicated by the reference numeral 16 in FIGURE 3 and includes temperature sensing rod and tube arrangement 17 for controlling the normal cooking operations of the oven 11 in a manner hereinafter described.

The structural details and operation of the rod and tube temperature sensing arrangement 17 will now be described and reference is made to FIGURE 2.

As illustrated in FIGURE 2, the rod and tube arrangement 17 includes a tube means 18 having one end means 19 thereof secured to a frame means 20 adapted to be mounted to the wall means 21 of the cooking apparatus 10 by a bracket means 22, the other end means 23 of the tube means 18 being adapted to project through an opening in the rear wall means 21 of the apparatus 10 to sense the temperature in the oven 11.

A rod means 24 is disposed within the tube means 18 and has one end means 25 adapted to move in unison with the end means 23 of the tube means 18 in a manner hereinafter described and has an opposed end means 26 projecting out of the opened end means 19 of the tube means 18 to cause actuation of a pneumatic fluid containing chamber defining means 27 in a manner hereinafter described.

The chamber defining means 27 is a bellows construction formed from a pair of rigid wall means 28 and 29 interconnected together by a tubular bellows construction 30 having the opposed opened ends 31 and 32 thereof respectively sealed and secured to the rigid wall means 28 and 29 to define a chamber 33 therebetween. The rigid wall means 29 is secured from movement to the frame means 20 and the rigid wall means 28 is movable relative thereto and is substantially cup-shaped to define an opened end 34 and a closed end 35 thereof.

The end means 26 of the rod means 24 is received in the opened end 34 of the cup-shaped movable wall means 28 and engages an ambient temperature compensating means 36 disposed between the end means 26 and the closed end 35 of the movable wall means 28. In the embodiment illustrated in the drawings, the ambient compensating means 36 comprises a pair of cup-shaped disc members 37 formed of bimetallic material and having the open ends 38 thereof abutting each other.

In this manner, should the ambient temperature surrounding the end means 26 of the rod 24 increase to tend to cause the pneumatic fluid in the chamber 33 to expand, the cup-shaped bimetal members 37 tend to flatten to permit the fluid in the chamber 33 to expand and thereby prevent the same from being forced out of the chamber 33 into a conduit means 39 leading to a chamber of another pneumatic fluid containing chamber defining means 40. Conversely, should the ambient temperature surrounding the chamber defining means 27 decrease to tend to cause a contraction in the pneumatic fluid in the chamber 33, the bimetal members 37 tend to further bow to reduce the volumetric capacity of the chamber 33 so that fluid will not be drawn from the other chamber defining means 40 through the conduit 39 into the chamber 33.

The other chamber defining means 40 is disposed in a casing 41 mounted to the control panel 12 of the cooking apparatus 10 by mounting means 42. The casing 41 includes an internally threaded member 43 threadedly receiving an externally threaded adjusting member 44 having a bore 45 passing therethrough. A control shaft 46 has one end 47 fixed to the adjusting member 44 and receives a control knob 48 on the other end 49 thereof. The shaft 46 carries an internally threaded member 50 receiving a threaded calibration screw 51 adapted to be adjusted inwardly and outwardly relative to the threaded member 50 on the shaft 46.

The chamber defining means 40 includes a stem 52 receivable in the bore 45 of the adjusting member 44 and has an end 53 disposed against the end 54 of the adjusting screw 51. The chamber defining means 40 is a conventional expandable and contractible fluid containing element having two cup-shaped elements 55 and 56 secured together at the outer periphery thereof to define a chamber 57 therebetween, the wall means 55 being substantially fixed while the wall means 56 is movable in response to the volume of pneumatic fluid in the chamber 57 in the manner hereinafter set forth.

The movable wall means 56 of the chamber defining means 40 carries a stem 58 having an end 59 adapted to abut a lever member 60 of a lever means 61 disposed in the casing 41.

The lever means 61 is carried by the frame means 41 and operatively interconnects the end 59 of the chamber defining means 40 with an electrical switch means 62.

In particular, the lever means 61 includes a first lever member 63, FIGURE 5, having a pair of legs 64 and 65 respectively pivotally mounted to opposed walls 66 and 67 of the casing means 41 by outwardly directed tangs 68 and 69 thereof being received in pivot slots 70 and 71. The lever member 63 carries a pair of electrical contacts 72 and 73 which move in unison with the lever member 63 and are respectively cooperable with a pair of fixed contacts 74 carried by housing means 75 of the electrical switch 62 and respectively interconnected to terminals 76 and 77 thereof, FIGURE 3.

The second lever member 60 is pivotally mounted to the casing means 41 by having outwardly directed tangs 78 and 79 thereof respectively received in pivot slots 80 and 81 in the side walls 66 and 67 of the casing 41. The lever member 60 has an embossment 82 which abuts against the end 59 of the chamber defining means 40.

A pair of tension spring means 83 each has one end 84 thereof interconnected to the free end 85 of the lever member 60 and the other end 86 interconnected to the lever member 63 whereby the tension spring means 83 cause the lever member 63 to move with a snap movement during its opening and closing operation of the switch means 62.

The chamber defining means 40 can be so adjusted relative to the lever member 60 that when the unit 17 senses a temperature above a predetermined temperature, such as around 325° F. during a cooking operation, the end means 59 of the pin means 58 has moved to the left in FIGURE 4 such a distance that the tension spring means 83 has caused the lever member 63 to snap to the left and break the electrical connection between the terminals 76 and 77 of the switch means 62 as the contacts 72 and 73 have been respectively moved away from the fixed contacts 74, the contacts 72 and 73 being electrically connected together by a bridging member 87.

When the temperature of the oven 11 falls below the predetermined temperature setting for the cooking operation thereof, the end means 59 of the pin means 58 has moved back to the right in FIGURE 2 a distance to cause movement of the lever member 60 so that the tension spring means 83 will snap the lever member 63 back to the right to again electrically interconnect the terminals 76 and 77 together for a purpose hereinafter described.

The control knob 48 comprises a selector means which when rotated relative to the control panel 12 will cause rotation of the adjusting member 44 and, thus, threaded axial movement of the adjusting member 44 relative to the fixed threaded member 43 of the casing means 41. Such axial movement of the adjusting member 44 also axially positions the end 54 of the adjusting member 51 whereby the spring means 83 of the lever means 61 causes the end 53 of the stem 52 of the chamber defining means 40 to follow the movement of the end 54 of the adjusting screw 51 so that the position of the chamber defining means 40 relative to the casing 41 and, thus, relative to the lever 60 can be adjusted by the control knob 48.

Accordingly, when the housewife or the like adjusts the control knob 48 to a desired temperature setting position thereof to cause operation of the heating means 13 in a manner hereinafter set forth, the tube means 18 of the rod and tube arrangement 17 will move to the left or to the right in FIGURE 2 depending upon an increase or decrease in the temperature of the oven 11 and since the rod means 24 has a lower coefficient of thermal expansion and contraction than the coefficient of thermal expansion and contraction of the tube means 18, the tube means 18 will cause the end means 26 of the rod means 24 to move to the left upon an increase in temperature and move to the right upon a decrease in temperature.

When the unit 17 is sensing an increase in temperature in the oven 11, the end means 26 of the rod means 24 moves to the left whereby the natural resiliency of the bellows construction 30 causes the wall means 34 to move in unison with the end means 26 to the left to increase the volumetric capacity of the chamber 33 whereby fluid is drawn from the chamber 57 of the chamber defining means 40 to fill the increased volume of the chamber 33 whereby the movable wall 56 of the chamber defining means 40 also moves to the left to correspondingly decrease the volumetric capacity of the chamber 57. With the wall 56 now moving to the left, the end 59 of the stem 58 also moves to the left permitting the lever member 60 to follow such leftward movement in such a manner that the spring means 83 of the lever means 61 will cause the lever member 60 to snap to its open position when the unit 17 senses an increase in temperature in the oven 11 above the temperature selected by the control knob 48.

In this manner, the contact means 72 and 73 are moved away from the contact means 74 to prevent current flow between the terminals 76 and 77.

Conversely, when the unit 17 senses a decrease in the temperature of the oven 11, the end means 26 of the rod means 24 moves to the right in FIGURE 2 and collapses the bellows member 30 to reduce the volumetric capacity of the chamber 33 whereby the fluid therein is forced out of the chamber 33 and through the conduit means 39 into the chamber 57 of the chamber defining means 40 to move the stem 58 thereof to the right in FIGURE 4. When the temperature being sensed by the unit 17 falls below the temperature selected by the knob 48, such rightward movement of the stem 58 of the chamber defining means 40 causes the lever means 61 to move the lever member 63 with a snap movement to close the contacts 72 and 73 against the contacts 74 of the switch 62 to again electrically interconnect the terminals 76 and 77 thereof.

Therefore, it can be seen that the rod and tube arrangement 17 is adapted to accurately control the operation of the switch means 62 even though the switch means 62 and the chamber defining means 40 are disposed in a remote location relative to the chamber defining means 27 sensing the movement of the end means 26 of the rods means 24.

As illustrated in FIGURE 2, the rods means 24 of the sensing unit 17 includes a member 88 fastened in the end 23 of the tube means 18 by having an inwardly directed annular bead 89 of the tube means 18 deformed into an annular peripheral recess 90 in the member 88.

The rod means 24 also includes a member 91 slidably disposed in the tube means 18 and substantially filling the same in a transverse cross sectional dimension thereof, the member 91 forming the end means 26 of the rod means 24.

The members 88 and 91 are formed of the same material as the tube means 18 whereby the members 88 and 91 expand and contract at the same rate as the tube means 18. In this manner, the member 91 is formed of a length so that the left hand end 92 thereof will extend through the entire insulation means of the rear wall means 21 of the apparatus 10 whereby the remaining part 93 of the rod means 24 will be disposed in the oven 11.

The part 93 of the rod means 24 has a smaller transverse cross sectional dimension than the transverse cross sectional dimension of the internal peripheral surface of the tube means 18 and respectively has the opposed ends 94 and 95 thereof received in closed bores 96 and 97 of the members 88 and 91, the part 93 having a lower coefficient of thermal expansion and contraction than the coefficient of thermal expansion and contraction of the tube means 18 to perform the previously described temperature sensing operation on the bellows construction 27. The natural resiliency of the bellows member 30 maintains the parts 91, 93 and 88 in abutting aligned relation.

The temperature sensing unit 17 is utilized in the system 16 of FIGURE 3 in a manner now to be described.

As illustrated in FIGURES 2 and 3, the casing 41 carries a limit switch 98 having an operating plunger 99 engageable by cam means 100 carried by the adjustable member 44.

The switch means 98 is so constructed and arranged that the same is adapted to electrically interconnect a lead 101 with a lead 102 leading to one side 103 of the broil element 15 when the control knob 48 is disposed in its "broil" position as illustrated in FIGURE 3, the lead being electrically connected to the terminal 77.

However, when the control knob 48 is disposed in any other position than its "broil" position, the cam means 100 causes the switch means 98 to disconnect the lead 101 from the lead 102 and electrically interconnect the same to a lead 104 interconnected to one side 105 of the bake element 14.

The other terminal 76 of the switch 62 is interconnected to the power source lead $L^1$ by a lead 106.

The other sides 107 and 108 of the bake element 14 and broil element 15 are respectively interconnected to the power source lead $L^2$ by leads 109 and 110.

The operation of the temperature sensing unit 17 as utilized in the control system 16 of FIGURE 3 will now be described.

When the control knob 48 is disposed in its "off" position, the adjusting member 44 has been moved axially to the left in FIGURES 2 and 4 such a distance that regardless of the temperature being sensed by the unit 17, the lever member 63 is held in the position illustrated in FIGURE 4 so that no current can pass between the terminals 76 and 77 thereof, and thus, to the heating means 13.

When the housewife or the like desires to utilize the system 16 for causing a cooking operation in the oven 11 by utilizing the bake element 14 thereof, the housewife turns to the control knob 48 to the desired temperature setting thereof whereby the chamber defining means 40 is adjusted to the right in FIGURES 2 and 4 to the proper temperature setting position thereof. Since the temperature in the oven 11 being sensed by the unit 17 is below the temperature selected the lever member 63 is in its switch closing position of FIGURE 2 whereby current from the lead $L^1$ is adapted to flow from the terminal 76 to the terminal 77. Since the switch 98 is interconnecting the lead 101 to the lead 104, the bake element 14 is placed across the power source leads $L^1$ and $L^2$ to heat the oven 11.

When the temperature in the oven 11 exceeds the temperature selected by the control knob 48, the tube means 18 has elongated to the left in FIGURE 2 a distance to cause sufficient collapsing of the chamber defining means 40 in the manner previously described to cause the lever member 63 to snap to its open position illustrated in FIGURE 4 to terminate the flow of electrical current to the bake element 14 until the unit 17 again senses a temperature below the selected temperature to cause the lever 63 to again move to its closed position of FIGURE 2.

In this manner, it can be seen that the temperature sensing unit 17 of this invention is adapted to cycle on and off the bake element 14 to tend to maintain the temperature in the oven 11 at the temperature selected by the control knob 48.

Should the housewife or the like desire to operate the oven 11 for a broiling operation thereof, the housewife or the like turns the control knob 48 to its "broil" position of FIGURE 3 whereby the cam means 100 operates the switch 98 to disconnect the lead 101 from the lead 104 and to electrically interconnect the lead 101 with the lead 102 whereby the electrical current thermostatically controlled by the switch means 62 can only be supplied to the broil element 15 whereby the temperature sensing unit 17 of this invention maintains the temperature in the oven 11 at the broiling temperature, such as 600° F. or the like, in the manner previously described for the thermostatic operation of the bake element 14.

Therefore, it can be seen that this invention not only provides an improved oven control means utilizing a rod and tube arrangement, but also this invention provides an improved part for such as oven control means or the like.

While the form of the invention now preferred has been disclosed as required by statute, other forms may be used, all coming within the scope of the claimed subject matter which follows.

What is claimed is:

1. In combination, a rod and tube temperature sensing unit having an end movable in response to sensed temperature changes, a first expandable and collapsible pneumatic fluid containing chamber defining means operatively interconnected to said end to be expanded and collapsed in accordance with the corresponding movement of said end frame means remote from said first chamber defining means, a second expandable and collapsible pneumatic fluid containing chamber defining means carried by said frame means, conduit means fluidly interconnecting the chambers of said first and second chamber defining means together so that expansion of said first chamber defining means will cause collapsing of said second chamber defining means and collapsing of said first chamber defining means will cause expansion of said second chamber defining means, electrical switch means carried by said frame means and being operatively interconnected to said second chamber defining means to be opened and closed in response to expansion and collapsing of said second chamber defining means from a predetermined volumetric condition of said second chamber defining means, and selector means operatively interconnected to said second chamber defining means for selectively determining said predetermined volumetric condition of said second chamber defining means.

2. A combination as set forth in claim 1 wherein said selector means positions said second chamber defining means relative to said frame means to determine said predetermined volumetric condition thereof.

3. A combination as set forth in claim 1 wherein lever means are carried by said frame means, said lever means being operatively interconnected to said second chamber defining means and to said switch means whereby collapsing movement of said second chamber defining means away from said lever means to reduce the volume of said second chamber defining means below said condition thereof opens said switch means and whereby expanding movement of said second chamber defining means toward said lever means to increase the volume of said second chamber defining means above said condition thereof closes said switch means.

4. A combination as set forth in claim 1 wherein a second frame means is provided, said unit having the tube means thereof provided with one end fixed to said second frame means, said first chamber defining means having one end thereof fixed to said second frame means, and said unit having the rod means thereof provided with one end projecting out of said one end of said tube means and being operatively interconnected to the other end of said first chamber defining means whereby said other end of said first chamber defining means follows the movement of said one end of said rod means.

5. A combination as set forth in claim 1 wherein said second chamber defining means comprises a movable wall means and a fixed wall means interconnected together to define said chamber thereof therebetween.

6. In a cooking apparatus having an oven provided with heating means therefor, the improvement comprising a rod and tube temperature sensing unit having an end movable in response to temperature changes in said oven caused by the operation of said heating means, a first expandable and collapsible pneumatic fluid containing chamber defining means operatively interconnected to said end to be expanded and collapsed in accordance with corresponding movements of said end, a second expandable and collapsible pneumatic fluid containing chamber defining means carried by said apparatus remote from said first chamber defining means, conduit means fluidly interconnecting the chambers of said first and second chamber defining means together so that expansion of said first chamber defining means will cause collapsing of said second chamber defining means and collapsing of said first chamber defining means will cause expansion of said second chamber defining means, electrical switch means carried by said apparatus and being operatively interconnected to said second chamber defining means to be opened and closed in response to expansion and collapsing of said second chamber defining means from a predetermined volumetric condition of said second chamber defining means, a source of electrical current, means operatively interconnecting said switch means with said source and said heating means so that when said switch means is closed said source is interconnected to said heating means to heat said oven and when said switch means is opened said source is disconnected from said heating means, and selector means operatively interconnected to said second chamber defining means for selectively determining said predetermined volumetric condition of said second chamber defining means.

7. In a cooking apparatus as set forth in claim 6, said selector means positioning said second chamber defining means relative to said apparatus to determine said predetermined volumetric condition thereof.

8. In a cooking apparatus as set forth in claim 6, lever means being carried by said frame means, said lever means being operatively interconnected to said second chamber defining means to said switch means whereby collapsing movement of said second chamber defining means away from said lever means to reduce the volume of said second chamber defining means below said predetermined volumetric condition thereof to open said switch means and whereby expanding movement of said second chamber defining means towards said lever means to increase the volume of said second chamber defining means above said predetermined volumetric condition thereof to close said switch means.

9. In a cooking apparatus as set forth in claim 6, a frame means being carried by said apparatus, said unit having the tube means thereof provided with one end fixed to said frame means, said first chamber defining means having one end thereof fixed to said frame means, said unit having the rod means thereof provided with one end projecting out of said one end of said tube means and being operatively interconnected to the other end of said first chamber defining means whereby said other end of said first chamber defining means follows the movement of said one end of said rod means.

10. In a cooking apparatus as set forth in claim 6, said second chamber defining means comprising a movable wall means and a fixed wall means interconnected together to define said chamber thereof therebetween.

11. A rod and tube temperature sensing unit comprising a tube means having opposed ends, a rod means disposed in said tube means and having opposed ends with one of said ends moving in unison with one of said ends of said tube means, a bellows construction having a fixed wall means and a movable wall means defining a fluid chamber therebetween, said movable wall means being substantially cup-shaped with the closed end thereof projecting into said bellows construction to reduce the volumetric capacity of said chamber, the other end of said rod means being received in the open end of said cup-shaped movable wall means and being operatively interconnected thereto so that said movable wall will follow movement of said other end of said rod means whereby the volumetric capacity of said chamber will vary according to the temperature sensed by said unit.

12. A unit as set forth in claims 11 wherein ambient temperature compensating means is disposed between said other end of said rod means and said movable wall means of said bellows construction.

13. A unit as set forth in claim 12 wherein said compensating means comprises bimetal means.

14. A unit as set forth in claim 13 wherein said bimetal means comprises two cup-shaped discs having the open ends thereof engaging each other with the closed ends thereof respectively engaging said other end of said rod means and said movable wall means of said bellows construction.

15. A unit as set forth in claim 11 wherein said rod means includes a member having the same coefficient of thermal expansion and contraction as the coefficient of thermal expansion and contraction of said tube means, said member providing said other end of said rod means.

16. A unit as set forth in claim 15 wherein said member is disposed in sliding relation with the inner peripheral surface of said tube means.

17. A unit as set forth in claim 16 wherein said rod means includes another member fastened in said tube means adjacent said one end of said tube means, said rod means including shaft means having the outer peripheral surface thereof spaced inwardly from the inner peripheral surface of said tube means, said members respectively having bores therein receiving the opposed ends of said shaft means.

18. A unit as set forth in claim 11 and including frame means, the other end of said tube means being fixed to said frame means, said fixed wall means of said bellows construction being fixed to said frame means, said other end of said rod means projecting out of said other end of said tube means.

19. A unit as set forth in claim 18 wherein the natural resiliency of said bellows construction forces said movable wall means thereof into operative engagement with said other end of said rod means.

20. A unit as set forth in claim 18 wherein said frame means carries a mounting bracket for mounting said unit to a desired supporting structure.

21. A unit as set forth in claim 11 wherein said movable wall means is a rigid cup-shaped member and fixed wall means is a rigid member, said rigid members being interconnected together by a metallic bellows tube cooperating with said rigid members to define said chamber.

References Cited

UNITED STATES PATENTS

| | | | |
|---|---|---|---|
| 2,782,285 | 2/1957 | Cantlin | 200—137 |
| 2,851,559 | 9/1958 | Rosen | 200—137 |
| 3,027,444 | 3/1962 | Weeks | 126—273 |
| 3,327,094 | 6/1967 | Martin et al. | 219—393 |
| 3,045,085 | 7/1962 | Reingruber | 200—137 |

BERNARD A. GILHEANY, *Primary Examiner.*

H. B. GILSON, *Assistant Examiner.*